J. A. SCANLAND.
HARVESTER REEL SUPPORT.
APPLICATION FILED AUG. 24, 1906.

941,655.

Patented Nov. 30, 1909.

3 SHEETS—SHEET 1.

Witnesses:

Inventor:
Jesse A. Scanland,
By Chas. W. Chambers.
Attorney.

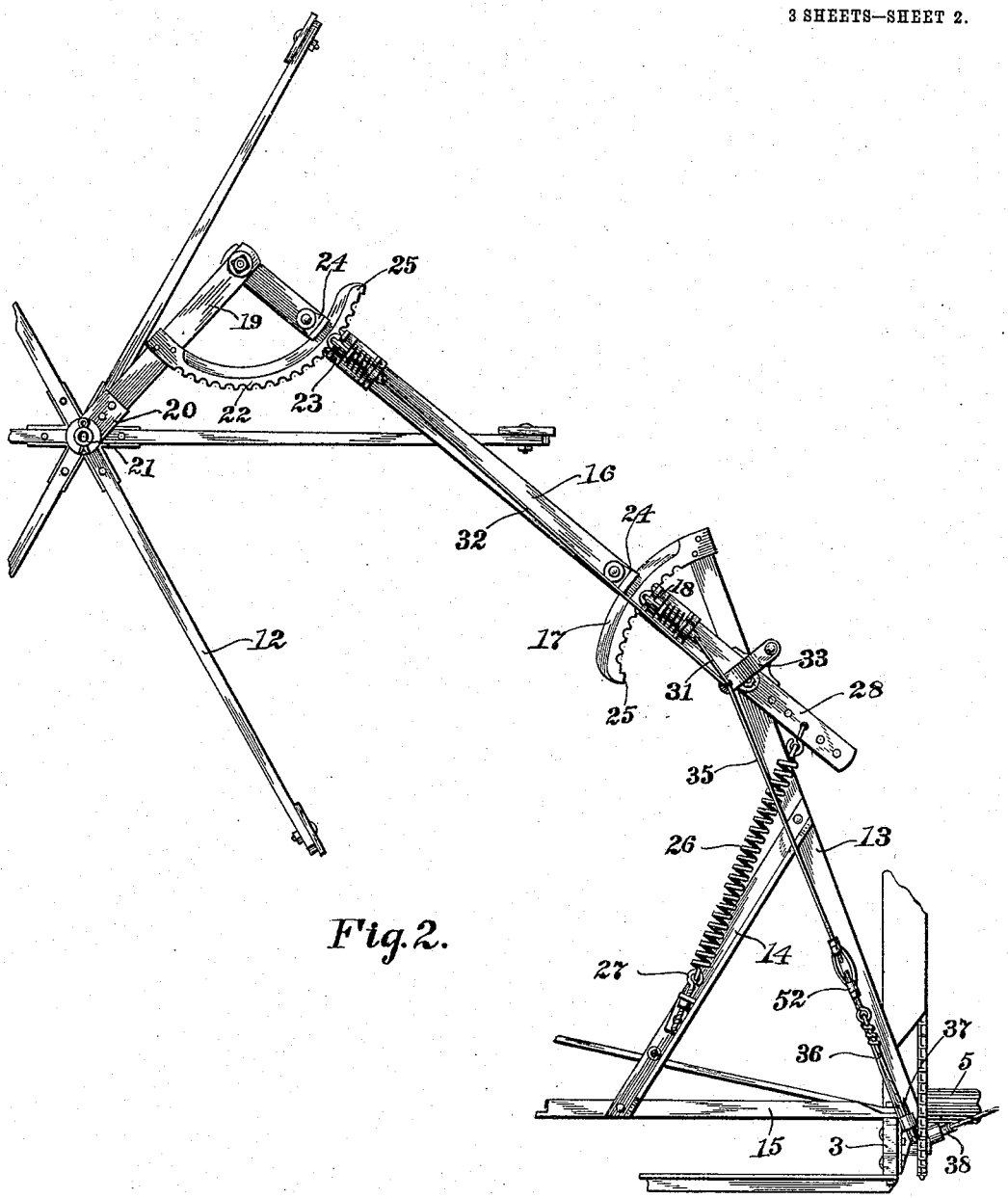

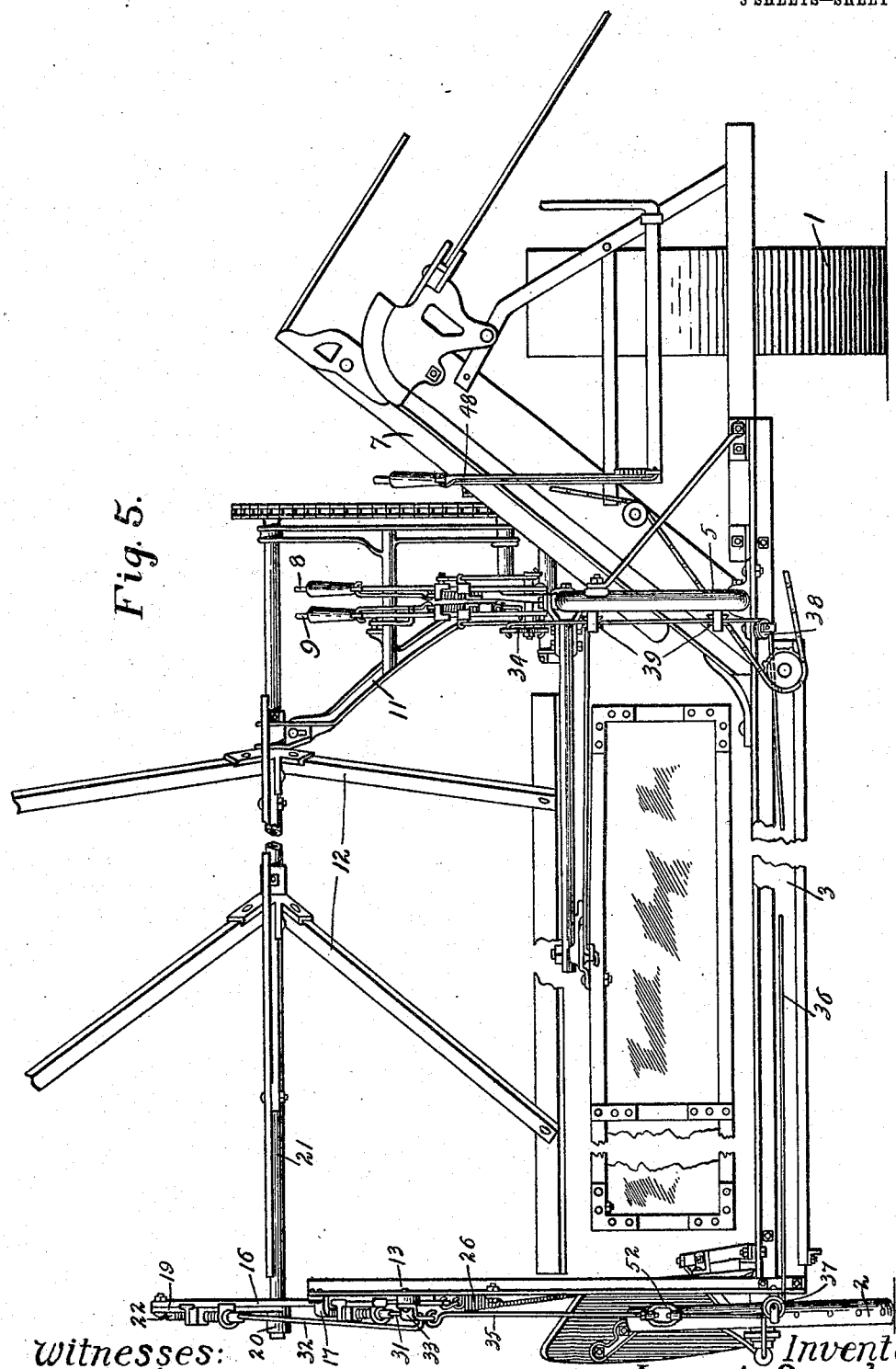

UNITED STATES PATENT OFFICE.

JESSE A. SCANLAND, OF PEORIA, ILLINOIS, ASSIGNOR TO ACME HARVESTING MACHINE COMPANY, OF PEORIA, ILLINOIS, A CORPORATION OF NEW JERSEY.

HARVESTER-REEL SUPPORT.

941,655.  Specification of Letters Patent.  Patented Nov. 30, 1909.

Application filed August 24, 1906. Serial No. 331,824.

*To all whom it may concern:*

Be it known that I, JESSE A. SCANLAND, a citizen of the United States, and a resident of Peoria, in the county of Peoria and State of Illinois, have invented a new and useful Improvement in Harvester-Reel Supports, of which the following is a specification, such as will enable those skilled in the art to which it appertains to make and use the same.

My invention relates in general to harvester reels, and more particularly to the means for supporting and adjusting them to suit different conditions of grain.

It has for its object to provide means for supporting the outer end of the reel; to provide such means as may readily be adjusted; and to provide means for simultaneously disengaging the latching devices for the support of each end of the reel.

Heretofore it has been the practice in the construction of harvesters of the "pull" type to mount the reel shaft in an adjustable frame located at the inner end thereof, whereby the reel is supported at one end only. In machines of 5- and 6-foot cut this method is very satisfactory but in machines of 7- and 8-foot cut, which are largely in demand at the present time, it is very unsatisfactory, since the outer end of the reel being unsupported whips about, frequently catching on the guards and bringing excessive strains on the supporting frame and the reel itself, all of which endangers one or another part of the machine. Attempts have heretofore been made to support and adjust the reel at both ends, but all have proved so complicated and expensive or inefficient that they have never come into common use, if in fact any use at all.

My invention is designed to overcome the objections to former devices of the same type by providing a support for the outer end of the reel, which is adjustable with the inner support through the intermediacy of the reel and is flexible when adjusted, but after adjustment is made rigid at will, whereby, during the operation of the machine, the reel is supported at both ends.

An embodiment of my invention is shown in the accompanying drawings forming a part of this specification, in which like characters of reference designate like parts.

Figure 1:
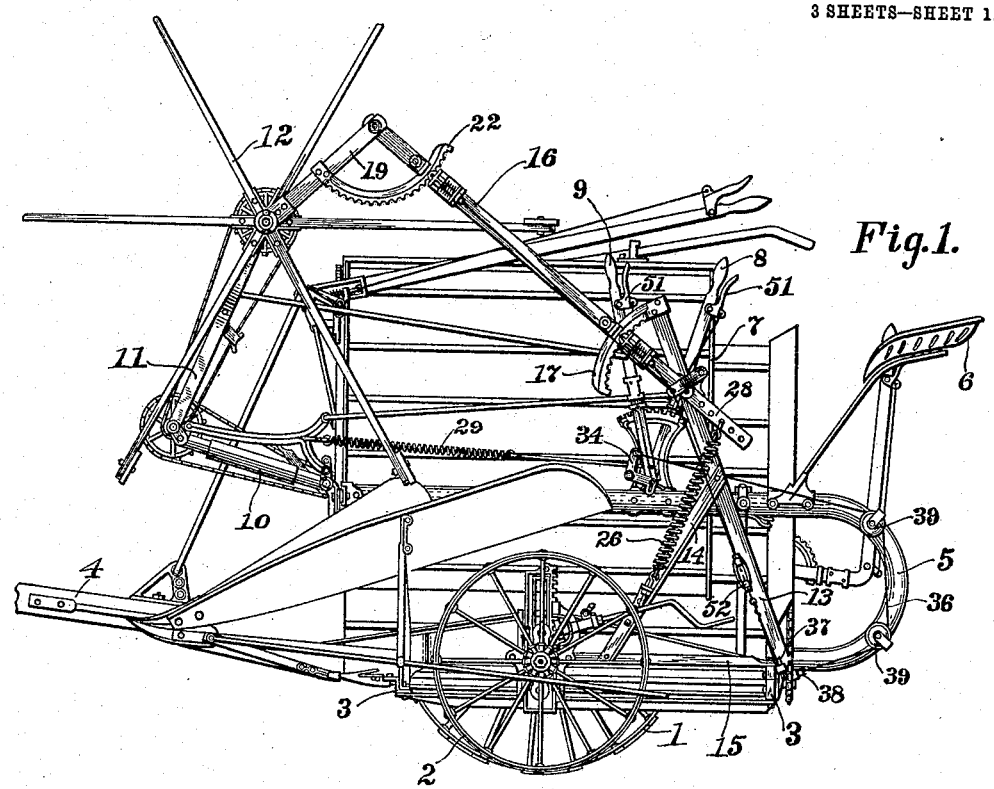
Figure 4:
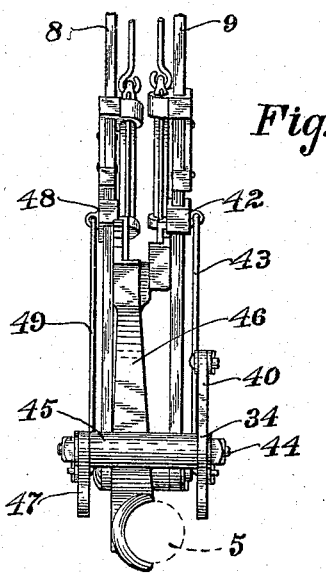
Figure 3:
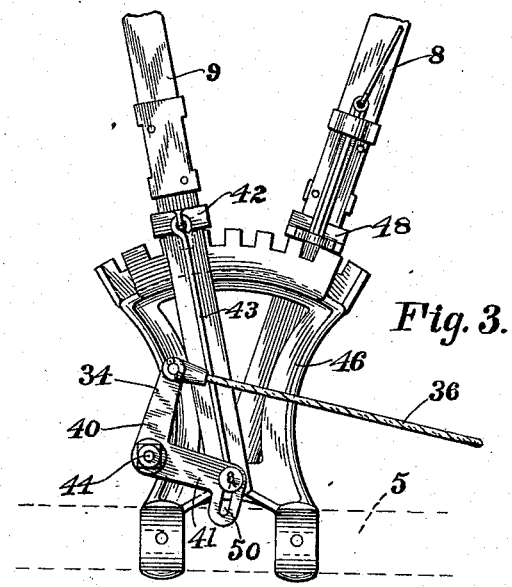

In these drawings, Figure 1 is an outer end elevation of a harvester showing my invention and the manner of applying it; Fig. 2 is a side elevation of my reel support, on an enlarged scale, showing its construction more in detail; Fig. 3 is a side elevation, on a still larger scale, of the adjusting levers connected directly with the inner support showing the means for connecting the latches of each with the latches of the outer support; Fig. 4 is a front elevation of the part shown in Fig. 3. Fig. 5 is a rear elevation of a harvester showing the relative position of the reel and its inner and outer supports; the seat shown in Fig. 1 being omitted for clearness.

Referring to Fig. 1 of the drawings, 1 designates the traction wheel and 2 the grain wheel of a harvester, upon which the main-frame 3 is mounted and held in equilibrium by the tongue 4 in the usual manner. Secured to and forming a part of the main-frame is the U-shaped seat pipe 5, which supports the seat 6, the over-hung upper elevator 7, and the reel adjusting levers 8 and 9. At the forward end of the seat pipe is mounted the inner reel support formed of the two articulating members 10 and 11, of familiar construction, which carry the usual driving gearing for imparting motion to the reel 12. The reel adjusting levers are connected respectively to the articulating members of this inner support in the ordinary way, whereby the reel may be raised and lowered, or moved forward and backward as the condition of the grain requires.

As so far described, the construction may be of the usual or any preferred form, for my invention may readily be adapted to the same.

Secured to the rear sill of the main-frame 3 adjacent to the plane of the grain wheel is a standard 13 preferably formed of an angle-iron and inclined forward, which standard is suitably braced by an angle-iron brace 14 secured to it and to the outer sill 15 forming a part of the divider truss of the main-frame. Near the upper end of this standard is pivoted a supporting arm 16 which extends forward and is adapted to be held in different positions in a fixed relation with the standard 13 by means of a ratchet quadrant 17, secured to the upper end of the standard, and a latch 18, engaging therewith and carried by the arm, to both of which reference will be made later. Pivoted to the arm 16 is a depending arm 19 which carries a bearing 20 at its lower end in which the outer end of the reel shaft 21 is journaled. This depending arm also is adapted to be held in different positions in a fixed relation with the supporting arm 16, in the same way this supporting arm is held in a fixed relation with the standard 13; that is, by means of a ratchet quadrant 22 carried by the depending arm and a latch 23 engaging therewith and secured to the supporting arm. Suitable guides 24 serve to hold the quadrant in an operative position and stops 25 to prevent their passing beyond their operative limits. In order that the weight of the outer end of the reel may be counterbalanced, a spring 26 is provided, which is connected at one end by means of an adjustable bolt 27 to the brace 14 and at the other to the rearward extension 28 of the supporting arm. A series of holes is provided in this extension for varying the effective arm through which the spring acts, and hence the leverage on the reel. The inner end of the reel is counterbalanced as usual by the spring 29.

From the above description it will be readily seen that the outer end of the reel is supported by two articulating members similar in action to those supporting the inner end, and that if both the latches 18 and 23 were disengaged from their respective ratchets 17 and 22, the outer end of the reel would then be free so that the reel could be moved in any direction in the usual manner within the limits of its adjustment, regardless of the relative length of the articulating members, or the location of their pivotal points. Since, in the present embodiment of my invention, the articulating members of the outer support differ greatly in length from those of the inner support and their pivotal points are far out of line, it is necessary that both latches of the outer support be disengaged. To this end they are provided with latch rods 31 and 32 which are connected to a swinging arm 33 mounted upon the supporting arm 16 near its pivotal point. This swinging arm is in turn connected with a lever 34, adapted to be operated from the driver's seat, by means of a rod 35 and a cable 36, which latter passes over a pulley 37 at the outer rear end of the platform, thence along the rear edge of the platform and over a pulley 38 at the lower arm of the U-shaped seat pipe 5 and then over succeeding pulleys as 39 to the operating lever 34. Since now both of these latches must be disengaged simultaneously with the disengagement of the latch of either of the adjusting levers 8 or 9, it is desirable that the operating lever 34 be connected with the latch of each adjusting lever so that the number of levers to be manipulated may be reduced to a minimum. With this object in view the operating lever 34 is made in the form of a bell-crank, one arm 40 of which is connected with the cable 36, and the other arm 41 with the latch 42 of adjusting lever 9 by means of a link 43. This operating lever is secured to a rock shaft 44 journaled in a suitable box 45 which preferably forms a part of the ratchet quadrant 46. To the opposite end of this rock shaft is secured the arm 47 which is connected with the latch 48 of the adjusting lever 8 by means of a link 49. In order that either ratchet may be moved independent of the other the arms 41 and 47 are provided with slots as 50, in which the links 43 and 49 slide, when one or the other of the latches are operated by the usual latch handles as 51. Latches 42 and 48, although they are not provided with springs as is usual, are held in proper engagement with their respective ratchets by the springs of the latches 18 and 23, both of which operate simultaneously. The turnbuckle 52 is provided to adjust the operative length of cable 36.

The operation of my invention it is thought will be easily understood from the above description, without further comment. In a word, however, it is as follows: When it is desired to adjust the reel the latch of either of the levers 8 or 9 is disengaged from its ratchet by means of the latch handle in the usual manner. Both the latches of the outer support, being connected with each of these latches, are disengaged from their ratchets by the same operation, thus making the outer support flexible and adapted to be adjusted at will through the intermediacy of the inner support, to which the adjustment levers are connected, and the reel itself. After the reel has been adjusted as desired, the latch handle is released so that the latches engage their respective ratchets again, whereby both supports are made rigid and the reel supported at both ends.

Having thus described my invention, what I claim as new and desire to secure by Letters Patent, is:

1. In a harvester, the combination of a reel, a support therefor, and means for adjusting said support through the intermediacy of said reel.

2. In a harvester, the combination of a reel, a flexible support therefor, and means for adjusting said support through the intermediacy of said reel.

3. In a harvester, the combination of a reel, a support therefor formed of two or more articulating members, and means for adjusting said support through the intermediacy of said reel.

4. In a harvester, the combination of a reel, a support for the inner end thereof, means for adjusting said support, a support for the outer end of said reel formed of two or more articulating members, means for holding said members relatively rigid, and means also for releasing the same at will.

5. In a harvester, the combination of a reel, a support for each end formed of two or more articulating members, means for holding said members relatively rigid, and means also for releasing the same at will.

6. In a harvester, the combination of a reel, an inner and an outer support therefor each formed of two or more articulating members, means for holding said members relatively rigid, and means also for simultaneously releasing the members of the outer support at will.

7. In a harvester, the combination of a reel, a support for the inner end thereof, means for adjusting said support, a support for the outer end of said reel, both of said supports formed of two or more articulating members, means for holding the members of each support relatively rigid, and means also for simultaneously releasing at will said members of the outer support and any of said members of the inner support.

8. In a harvester, the combination of a reel, a support for the inner end thereof formed of two articulating members, an adjusting lever connected with each of said members, a latch and a ratchet quadrant for each of said levers, a support for the outer end of said reel formed of two movable articulating members, a latch and ratchet quadrant for each of the members of said outer support, and a connection between each of the latches of the adjusting levers and the latches of the outer support.

In testimony whereof, I have signed my name to this specification in the presence of two subscribing witnesses.

JESSE A. SCANLAND.

Witnesses:
S. D. PORTER,
F. A. SMITH.